United States Patent
Usami et al.

(10) Patent No.: US 8,426,072 B2
(45) Date of Patent: Apr. 23, 2013

(54) FUEL CELL SYSTEM

(75) Inventors: Sho Usami, Susono (JP); Yasushi Araki, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 424 days.

(21) Appl. No.: 12/678,917

(22) PCT Filed: May 20, 2009

(86) PCT No.: PCT/JP2009/059279
§ 371 (c)(1),
(2), (4) Date: Mar. 18, 2010

(87) PCT Pub. No.: WO2010/134174
PCT Pub. Date: Nov. 25, 2010

(65) Prior Publication Data
US 2011/0217601 A1   Sep. 8, 2011

(51) Int. Cl.
H01M 8/06 (2006.01)
(52) U.S. Cl.
USPC ........... 429/415; 429/408; 429/410; 429/411; 429/417; 429/422; 429/444
(58) Field of Classification Search .................. 429/408, 429/410, 411, 415, 416, 417, 418, 422, 427, 429/430, 431, 432, 444; H01M 8/06
See application file for complete search history.

(56) References Cited

FOREIGN PATENT DOCUMENTS

| JP | 2004 206948 | 7/2004 |
|---|---|---|
| JP | 2006 19120 | 1/2006 |
| JP | 2006 19121 | 1/2006 |
| JP | 2006 19123 | 1/2006 |
| JP | 2006 19124 | 1/2006 |
| JP | 2006019121 A * | 1/2006 |

OTHER PUBLICATIONS

International Search Report issued Sep. 1, 2009 in PCT/JP09/059279 filed May 20, 2009.

* cited by examiner

*Primary Examiner* — Basia Ridley
*Assistant Examiner* — Heng Chan
(74) *Attorney, Agent, or Firm* — Oblon, Spivak, McClelland, Maier & Neustadt, L.L.P.

(57) ABSTRACT

A hydrogen circulation type fuel cell system equipped with an electrochemical cell executes discharging an anode off-gas with impurities being condensed toward the outside of the system at a proper timing. The fuel cell system having a circulation route so that a fuel gas containing hydrogen is supplied on the side of an anode electrode for electrochemical reaction in a fuel cell and a part or whole of an anode off-gas given from the fuel cell can be circulated on the side of the anode electrode of the fuel cell again for the electrochemical reaction, includes an electrochemical cell enabling the hydrogen in the anode off-gas flowing through the circulation route by flowing the current between electrodes to be selectively supplied on the side of the anode electrode, in which a discharge timing of discharging the anode off-gas in the inlet port electrode of the electrochemical cell toward the outside of the system is controlled based on a predetermined discharge reference determined by a correlation between electric power consumed for hydrogen transmission in the electrochemical cell and a residual hydrogen concentration in the anode off-gas discharged by a discharge unit.

16 Claims, 14 Drawing Sheets

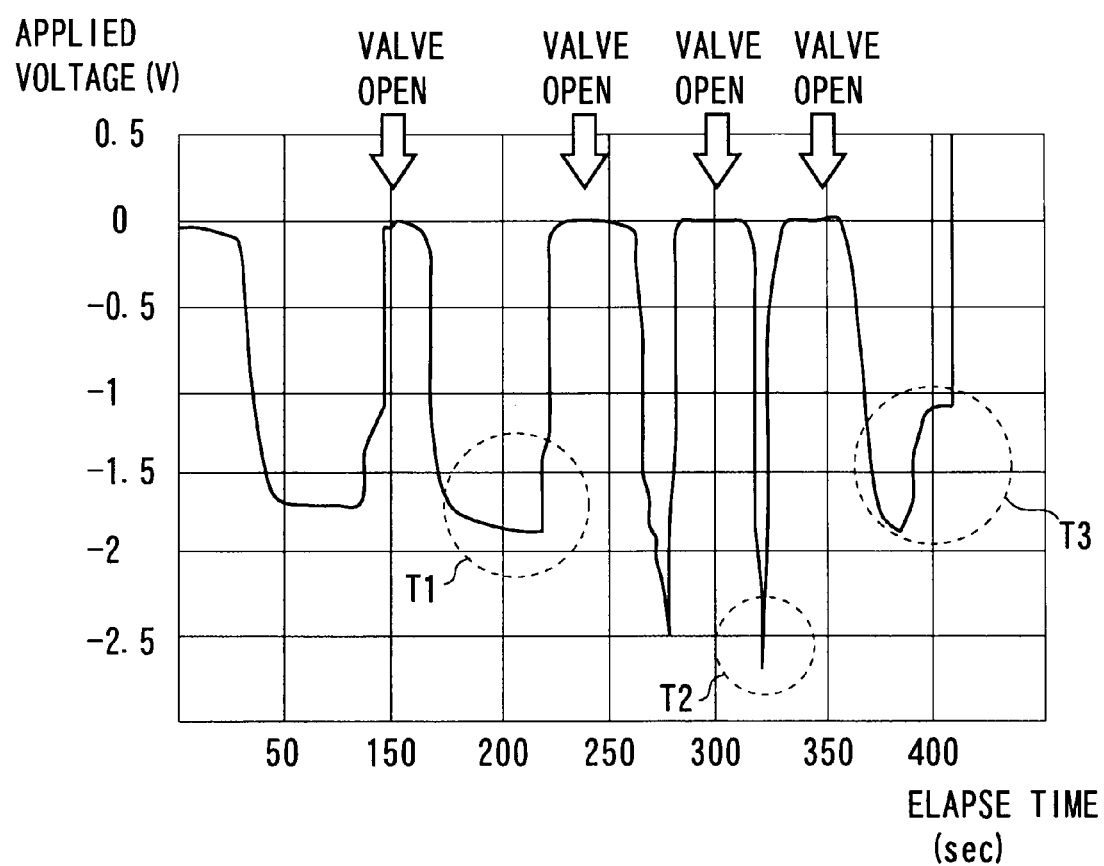

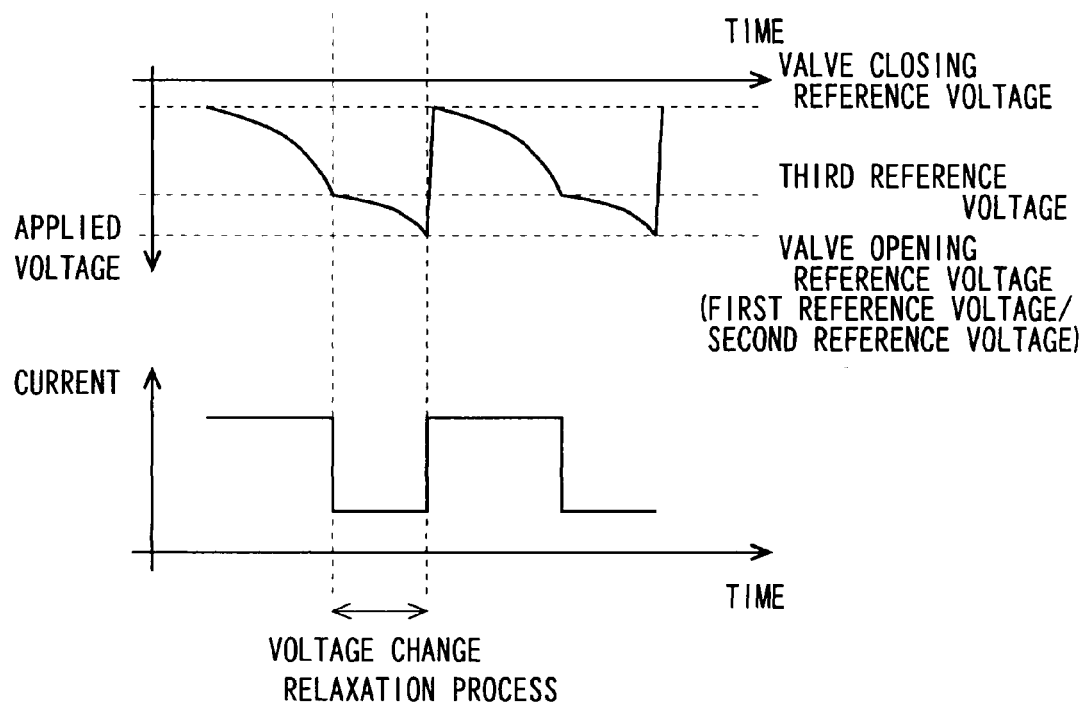

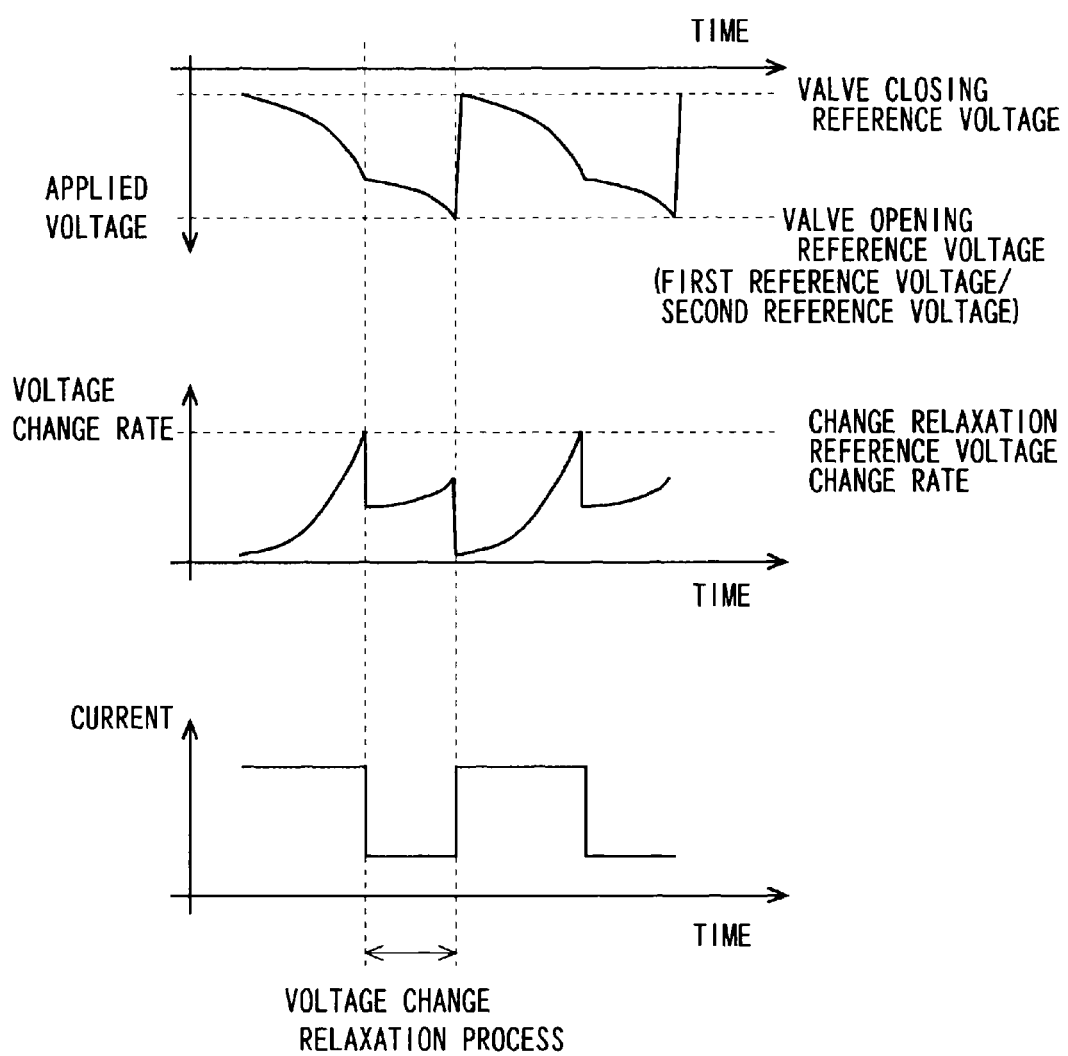

FUEL CELL SYSTEM

TECHNICAL FIELD

The present invention relates to a fuel cell system including a fuel cell.

BACKGROUND ARTS

In the fuel cell system which generates electricity through electrochemical reaction of a fuel gas containing hydrogen to an oxidation gas, a widely known technology is a technology of reusing the hydrogen by circulating an anode off-gas on the side of an anode of the fuel cell in order to efficiently utilize the hydrogen contained in the anode off-gas for generating the electricity. In this hydrogen circulation type fuel cell system, it is known that nitrogen transmitting an electrolyte film of the fuel cell from the side of the cathode and impurities contained in the fuel gas are accumulated on the side of the anode electrode of the fuel cell to thereby decrease a hydrogen partial pressure, resulting in a reduction of power generation efficiency of the fuel cell.

Then, such technologies (refer to, e.g., Patent documents 1-4) are disclosed that an electrochemical cell for condensing the impurities by getting the hydrogen contained in the anode off-gas to be selectively transmitted is provided on a circulation route of circulating the anode off-gas for keeping the power generation efficiency as described above, and the impurities in the anode off-gas, which are condensed as a result of the hydrogen transmission, are discharged outside the system. According to these technologies, a timing of discharging the condensed impurities is determined by making use of a value of the voltage applied to the electrochemical cell in order to perform the hydrogen transmission, and the discharge is conducted at a predetermined cycle. The hydrogen partial pressure on the side of the anode electrode can be thus increased by discharging the impurities.

DOCUMENTS OF PRIOR ARTS

Patent Documents

[Patent document 1] Japanese Patent Laid-Open Publication No. 2006-19120
[Patent document 2] Japanese Patent Laid-Open Publication No. 2006-19121
[Patent document 3] Japanese Patent Laid-Open Publication No. 2006-19123
[Patent document 4] Japanese Patent Laid-Open Publication No. 2006-19124

DISCLOSURE OF THE INVENTION

Problems to be Solved by the Invention

In the hydrogen circulation type fuel cell system including the electrochemical cell, a fluctuation of the hydrogen partial pressure on the side of the anode electrode depends largely on an operation state of the fuel cell, and hence, even when trying to discharge the anode off-gas with the impurities being condensed to the outside of the system periodically, the discharge timing is not necessarily proper, resulting in a possibility of leading to an excessive rise of the applied voltage of the electrochemical cell due to a decrease of the hydrogen partial pressure and to a futile discharge of the hydrogen.

Further, in the case of continuously applying the voltage to the electrochemical cell in order to perform the hydrogen circulation to the anode electrode of the fuel cell, an impurity concentration of nitrogen etc condensed in an inlet port electrode of the electrochemical cell increases with respect to a period of application continuous time. Simultaneously with this, however, an electrode area utilized effectively is reduced, then resistance of the electrochemical cell increases, and therefore, if a period of time thereof is excessively elongated, power consumption in the electrochemical cell rises, which leads to a possibility that a merit of performing the hydrogen condensation in the hydrogen circulation is canceled.

It is an object of the present invention, which was devised in view of the problems described above, to provide a fuel cell system which executes discharging an anode off-gas with condensed impurities to the outside of the system at a proper timing in a hydrogen circulation type fuel cell system including an electrochemical cell.

Means for Solving the Problems

According to the present invention, for solving the problems described above, the anode off-gas containing the condensed impurities is discharged in a way that takes account of a balance between hydrogen transmission efficiency of the electrochemical cell, in other words, condensation efficiency of the impurities such as nitrogen and a power quantity of electric power consumed in the electrochemical cell. With this contrivance, it is feasible to avoid discharging the hydrogen in an unprepared manner, to discharge the impurities outside the system with necessary timing and to improve [energy efficiency] in the fuel cell system.

Such being the case, specifically, the present invention is a fuel cell system having a circulation route so that a fuel gas containing hydrogen is supplied on the side of an anode electrode for electrochemical reaction in a fuel cell, and a part or whole of an anode off-gas given from the fuel cell can be circulated on the side of the anode electrode of the fuel cell again for the electrochemical reaction, the system including: an electrochemical cell having an inlet port electrode and an outlet port electrode with an electrolyte film being interposed therebetween, connected to the circulation route so that a part or whole of the anode off-gas discharged from the fuel cell is supplied to the inlet port electrode, getting the hydrogen contained in the anode off-gas to selectively transmit the outlet port electrode by a current flowing between the inlet port electrode and the outlet port electrode, and connected to enable the transmitted hydrogen to be supplied on the side of the anode electrode; a current control unit controlling a current flowing to between the inlet port electrode and the outlet port electrode in the electrochemical cell; a discharge unit provided on the side of the inlet port electrode of the electrochemical cell and discharging the anode off-gas within at least the inlet port electrode toward the outside of the system; and a discharge control unit controlling a discharge timing of the anode off-gas by the discharge unit according to a predetermined discharge reference determined by a correlation between electric power consumed for the hydrogen transmission in the electrochemical cell and a residual hydrogen concentration in the anode off-gas discharged by the discharge unit.

The fuel cell system is provided with the circulation route for circulating the hydrogen contained in the anode off-gas toward the anode electrode of the fuel cell and is provided with the electrochemical cell in order to effectively circulate the hydrogen. The electrochemical cell enables the hydrogen contained in the anode off-gas reaching the inlet port electrode side to transmit on the side of the outlet port electrode in accordance with the current flowing to between the electrodes of the electrochemical cell, whereby it is possible to circulate the hydrogen gas with the impurities being removed to the greatest possible degree with respect to the anode electrode of the fuel cell.

On the other hand, as a result of the hydrogen transmission by the electrochemical cell, on the side of the inlet port electrode thereof, it follows that the impurities such as the nitrogen contained in the anode off-gas are condensed. Then, when the impurity concentration rises at the inlet port electrode, a variety of inconveniences for the electrochemical cell might occur, and hence the anode off-gas containing the condensed impurities is discharged outside the system by the discharge unit. Herein, a discharge timing of the anode off-gas by the discharge unit exerts large influence on improving the fuel consumption of the fuel cell system. Specifically, with continuation of the hydrogen circulation via the circulation route, there decreases a hydrogen partial pressure on the circulation route and on the side of the anode electrode of the fuel cell in connection therewith, and therefore the power generation efficiency of the fuel cell decreases. On the other hand, the power generation efficiency can be recovered by discharging the anode off-gas by the discharge unit for scheming to recover the hydrogen partial pressure, however, if this operation is done so frequently, this leads to the unprepared discharge of the hydrogen, which becomes a wasteful consumption of the energy of the fuel cell system.

Moreover, when the hydrogen transmission is conducted as described above in the electrochemical cell for efficiently circulating the hydrogen to the fuel cell, since the hydrogen partial pressure on the side of the inlet port electrode decreases, the efficiency of the hydrogen transmission declines with an elapse of time, while the power consumption in the electrochemical cell increases due to the continuation of supplying the electric power, and finally there is a possibility that the electrochemical cell can not attain the hydrogen transmission corresponding to the power supply.

Such being the case, in the fuel cell system according to the present invention, the discharge unit executes the discharge of the anode off-gas according to a predetermined discharge reference determined from a correlation between the electric power consumed for the hydrogen transmission in the electrochemical cell and a residual hydrogen concentration in the anode off-gas discharged by the discharge unit, which is formed by the hydrogen transmission in the electrochemical cell. Namely, it follows that the discharge unit executes the discharge at the proper timing enabling the unprepared hydrogen discharge to be avoided by complying with the predetermined discharge reference with which a benefit of the hydrogen circulation corresponding to the power supply can be enjoyed in a way that takes account of a balance between a hydrogen circulation effect acquired by the hydrogen transmission by the electrochemical cell and the electric power consumed by the electrochemical cell.

Further, in the fuel cell system, wherein the discharge control unit may execute the discharge of the anode off-gas by the discharge unit when a time-based average of an integrated value of an applied voltage applied to between the inlet port electrode and the outlet port electrode of the electrochemical cell in a time elapse since an immediate predetermined completion timing when the discharge unit completes the discharge of the anode off-gas, exceeds a first reference voltage value corresponding to the predetermined discharge reference. Namely, such a mode can be adopted as to utilize, as the parameter for executing the discharge of the anode off-gas by the discharge unit, the time average of the integrated value of the applied voltage applied to between the inlet port electrode and the outlet port electrode of the electrochemical cell. The use of the time average provides such a merit that it is feasible to reduce misjudgment and a variation (scatter) due to an instantaneous fluctuation of the applied voltage, accuracy of a measuring device, an error caused by a noise in a measuring system, etc, and an expensive high-accuracy measuring device is not needed. On the other hand, the electric power consumed in the electrochemical cell is proportional to the applied voltage, and hence, though the instantaneous applied voltage can be used as the parameter for determining the discharge timing of the anode off-gas on the basis of the predetermined discharge reference, as described above, it is preferable to use the time average of the applied voltage. Moreover, the first reference voltage value can be adequately set based on the specific configuration of the fuel cell system (e.g., a power generation capacity of the fuel cell, the hydrogen transmission capability of the electrochemical cell, etc).

Moreover, in the fuel cell system, the discharge control unit may further execute the discharge of the anode off-gas by the discharge unit when a value of the applied voltage applied to between the inlet port electrode and the outlet port electrode of the electrochemical cell exceeds a second reference voltage value determined based on a load on the electrochemical cell due to a hydrogen deficient state in the inlet port electrode of the electrochemical cell. Namely, in addition to the first reference voltage corresponding to the time average of the integrated value of the applied voltage, the second reference voltage corresponding to the applied voltage is adopted as a reference voltage for determining the discharge timing of the anode off-gas. If the hydrogen deficient state occurs on the side of the inlet port electrode due to the continuation of the hydrogen transmission in the electrochemical cell, the applied voltage to between the inlet port electrode and the outlet port electrode rises, and finally there is a possibility of causing the deterioration of and the damage to the electrochemical cell. Then, in the fuel cell system, the anode off-gas is discharged according to the second reference voltage in order to exactly avoid the hydrogen deficient state, and it follows that the anode off-gas is discharged at the more proper timing. Note that the voltage value, with which the water electrolysis occurs due to the hydrogen deficient state in the inlet port electrode of the electrochemical cell, can be adopted by way of one example of the second reference voltage value. For others, it is possible to adopt the voltage with which to cause decomposition reaction of the electrolyte film of the electrochemical cell.

Herein, when controlling the current between the inlet port electrode and the outlet port electrode of the electrochemical cell, an effective area of the electrode for the hydrogen transmission is reduced due to the condensation of the impurities such as the nitrogen on the side of the inlet port electrode. Therefore, the value of the voltage applied to between the two electrodes rises, and it follows that the time average of the integrated value of the applied voltage and this applied voltage reach the first reference voltage or the second reference voltage described above. At this time, the change rate of the applied voltage between the two electrodes becomes large with the elapse of time as an electrical characteristic, and therefore, even if the discharge unit tries to discharge the anode off-gas when reaching the respective reference voltages, the substantial discharge of the anode off-gas is delayed corresponding to a period of time required for operating the discharge unit, resulting in a possibility that the discharge is hard to be actualized at the proper timing.

Then, in the fuel cell system discussed above, the current control unit may control the current between the inlet port electrode and the outlet port electrode by adjusting the applied voltage to between the two electrodes, and may perform the control of relaxing a time-based change rate of the applied voltage to between the inlet port electrode and the outlet port electrode of the electrochemical cell before the discharge control unit executes the discharge of the anode off-gas on the basis of the applied voltage applied to between the two electrodes. Thus, the current control unit relaxes the time-based change rate of the applied voltage to between the two electrodes, whereby the time required for operating the discharge unit can be ensured to thereby enable the anode off-gas to be discharged at the proper timing.

Herein, with respect to the relaxation control of the time-based change rate of the applied voltage by the current control unit, a variety of relaxing modes can be adopted, and examples thereof are given as below. For example, the current control unit may execute the relaxation of the time-based change rate of the applied voltage to between the inlet port electrode and the outlet port electrode by conducting at least one of reducing the current value between the two electrodes down to a level lower than before relaxing the time-based change rate of the applied voltage to between the two electrodes, and temporarily setting the current value between the two electrodes to zero. Thus, the change rate of the applied voltage may be relaxed by decreasing the current value between the two electrodes.

Moreover, as for the timing when starting the relaxation control by the current control unit, the relaxation of the time-based change rate of the applied voltage to between the two electrodes may be executed when the predetermined voltage related to the applied voltage applied to between the inlet port electrode and the outlet port electrode of the electrochemical cell exceeds the third reference voltage set lower than the reference voltage value on such an occasion that the discharge unit discharges the anode off-gas. The predetermined voltage connoted herein is a voltage related to the control of the discharge timing of the anode off-gas by the discharge unit. It may be the applied voltage between the two electrodes itself or may be a voltage derived from the applied voltage, e.g., an average voltage of an integrated value of the applied voltage. Further, it is preferable that the third reference voltage is determined in a way that takes the time required for operating the discharge unit into consideration. Still another mode is that the relaxation of the time-based change rate of the applied voltage to between the inlet port electrode and the outlet port electrode of the electrochemical cell may be executed when the predetermined voltage change rate related to the time-based change rate of the applied voltage applied to between the two electrodes exceeds the reference change rate determined based on the residual hydrogen concentration in the anode off-gas discharged by the discharge unit. The predetermined voltage change rate connoted herein is a voltage change rate related to the control of the discharge timing of the anode off-gas by the discharge unit, and may be a change rate of the applied voltage to between the two electrodes or may be a change rate of the voltage derived from the applied voltage, e.g., the average voltage of the integrated value of the applied voltage. Moreover, it is preferable that the predetermined change rate is determined in a way that takes the time required for operating the discharge unit into consideration.

Furthermore, as yet another mode with respect to the timing when starting the relaxation control by the current control unit, the current control unit may execute the relaxation of the time-based change rate of the applied voltage to between the inlet port electrode and the outlet port electrode of the electrochemical cell when an integrated current value between the two electrodes in a time elapse since an immediate predetermined completion timing when the discharge unit immediately completes the discharge of the anode off-gas, exceeds a reference integrated current value determined according to the residual hydrogen concentration in the anode off-gas discharged by the discharge unit. The integrated current value since the immediate predetermined completion timing when the discharge of the anode off-gas is completed reflects an integrated value of a quantity of the hydrogen transmitted in the electrochemical cell and is therefore a parameter linking up with the fluctuation of the time-based change rate of the applied voltage. Accordingly, the relaxation control based on the integrated current value is useful. It should be noted that the reference integrated current value is, it is preferable, determined in away that takes the time required for operating the discharge unit into consideration.

Moreover, in the fuel cell system, the current control unit may execute the relaxation of the time-based change rate of the applied voltage to between the inlet port electrode and the outlet port electrode of the electrochemical cell when the time-based change rate of the applied voltage to between the two electrodes belongs a predetermined area in a control map related to the time-based change rate of the applied voltage to between the two electrodes, which is determined based on the residual hydrogen concentration in the anode off-gas discharged by the discharge unit. This control map and the predetermined area therein are set based on the specific time-based change rate of the applied voltage in the electrochemical cell.

Effects of the Invention

In the hydrogen circulation type fuel cell system including the electrochemical cell, the discharge of the anode off-gas with the condensed impurities to the outside of the system can be executed at the proper timing.

BRIEF DESCRIPTION OF THE DRAWINGS

FIG. 2 A diagram illustrating transition of an applied voltage in the electrochemical cell which selectively conducts transmission of an anode off-gas.

FIG. 10A A first diagram illustrating a specific process for relaxing a change rate of the applied voltage of the electrochemical cell, which is executed in the control flow shown in FIG. 9.

FIG. 11 A fourth diagram illustrating the specific process for relaxing the change rate of the applied voltage of the electrochemical cell, which is executed in the control flow shown in FIG. 9.

BEST MODE FOR CARRYING OUT THE INVENTION

An embodiment of a fuel cell system according to the present invention will hereinafter be described in detail with reference to the drawings. A fuel cell system 10 according to the embodiment can be adopted as a power supply source which supplies electric power to a drive motor defined as a driving device of a vehicle as a mobile body, as a power supply source for a mobile body such as ship and a robot other than the vehicle and as a power supply source for an object which does not move but needs receiving the power supply.

First Working Example

Figure 1:
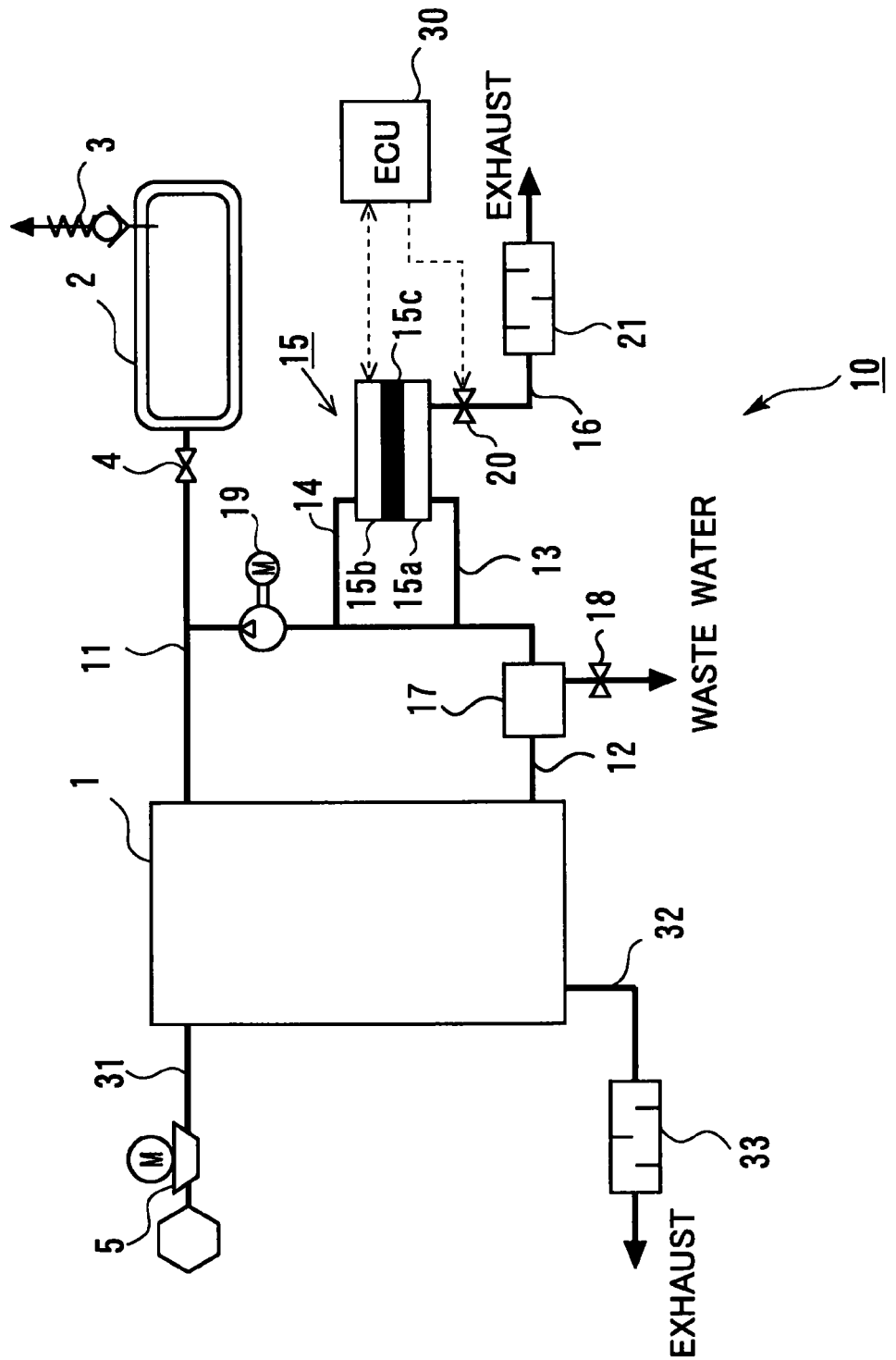
FIG. 1 A diagram illustrating an outline of a configuration of a fuel cell system according to a working example of the present invention.

FIG. 1 is a diagram illustrating an outline of a configuration of the fuel cell system 10 according to the present invention. The fuel cell system 10 includes a solid-state high polymer fuel cell 1 and is provided with a high-pressure hydrogen tank 2 which reserves hydrogen gas as a fuel and supplies the fuel to an anode electrode of the fuel cell 1 via a hydrogen supply path 11. The high-pressure hydrogen tank 2 is provided with an adjustment valve 3 for adjusting an internal pressure thereof, and the supply to the hydrogen supply path 11 from the high-pressure hydrogen tank 2 is conducted by opening and closing a supply valve 4. Further, a compressor 5 for supplying the air as an oxidant is connected to a cathode electrode of the fuel cell 1, in which the compressor 5 supplies the compressed air to the fuel cell 1 via an air supply path 31. Then, the supplied hydrogen and oxygen in the compressed air cause electrochemical reaction via an electrolyte of the fuel cell 1, thereby generating the electricity.

Herein, the fuel cell system 10 is provided with a configuration for circulating an anode off-gas on the side of the anode electrode of the fuel cell 1 for scheming to effectively utilize the hydrogen gas that is not supplied for the electrochemical reaction for generating the electricity in the hydrogen gas supplied to the fuel cell 1. To be specific, the anode off-gas discharged from the anode electrode of the fuel cell 1 is fed into, at first, a liquid-vapor separator 17 via a circulation route 12, in which a water content contained in the anode off-gas is removed. It should be noted that the water content removed by the liquid-vapor separator 17 is discharged outside the system by opening and closing a valve 18. Then, a pump 19 is provided on the circulation route 12 between the liquid-vapor separator 17 and the hydrogen supply path 11, and the anode off-gas with the water content being removed is again fed to the hydrogen supply path 11 by dint of pressure-feed action of the pump 19, whereby the hydrogen gas contained in the anode off-gas is reused.

Further, in the fuel cell system 10, an electrochemical cell 15 is installed in parallel with a part of the circulation route 12 between the liquid-vapor separator 17 and the pump 19. The electrochemical cell 15 has an inlet port electrode 15a and an outlet port electrode 15b with an electrolyte film 15c being interposed between these electrodes, in which the inlet port electrode 15a is connected via a communicating path 13 to the circulation route 12, while the outlet port electrode 15b is connected via a communicating path 14 to the circulation route 12, and a connecting position between the communicating path 14 and the circulation route 12 exists on a more downstream side in a direction along a flow of the anode off-gas within the circulation route 12 than a connecting position between the communicating path 13 and the circulation route 12, i.e., closer to the hydrogen supply path 11.

Then, the electrochemical cell 15 is a device capable of, with the current flowing to between the two electrodes such as the inlet port electrode 15a and the outlet port electrode 15b, ionizing hydrogen molecules in the anode off-gas existing on the side of the inlet port electrode 15a, getting these ions transmitted on the side of the outlet port electrode 15b and making the transmitted ions exist again as the hydrogen molecules on the side of the outlet port electrode 15b. Namely, the hydrogen is transmitted selectively toward the outlet port electrode 15b from within the anode off-gas fed toward the inlet port electrode 15a, as a result of this hydrogen transmissive action, impurities such as nitrogen (which are simply referred to as [impurities]) contained in the anode off-gas are condensed on the side of the inlet port electrode 15a, and a concentration of the hydrogen in the anode off-gas circulated through the hydrogen supply path 11 can be enriched, thereby scheming to improve the hydrogen utilization efficiency. It should be noted that the impurity condensing action on the side of the inlet port electrode 15a, which occurs as the result of the hydrogen transmissive action by the electrochemical cell 15 is termed "the impurity condensing action by the electrochemical cell 15" in some cases in the present specification.

Thus, the fuel cell system 10 can scheme to utilize the hydrogen more efficiently by including the electrochemical cell 15, however, on the other hand, the hydrogen concentration on the side of the inlet port electrode 15a of the electrochemical cell 15 decreases due to the impurity condensing action. Then, there is a possibility that a variety of undesirable influences (which will be described later on) are exerted on the electrochemical cell and on the fuel cell 1 due to the decrease of the hydrogen concentration, and hence the anode off-gas within the inlet port electrode 15a is required to be discharged outside the system at a proper timing. Such being the case, as a specific configuration for discharging the anode off-gas, the fuel cell system 10 includes a discharge path 16 connected on the most downstream side (i.e., when a part of the anode off-gas flowing through the circulation route 12 is fed to the inlet port electrode 15a via the communicating path 13, a position in which to connect the communicating path 13 to the inlet port electrode is defined as the most upstream side within the inlet port electrode 15a, and therefore it follows that the most downstream side is located on the opposite side)

within the inlet port electrode 15*a*, an discharge valve 20 which controls a flow of the gas flowing through the discharge path 16, and a depressurizing device 21 which depressurizes the gas flowing through the discharge path 16. The discharge path 16 opens, whereby the anode off-gas existing in the inlet port electrode 15*a* can be discharged outside the system.

The thus configured fuel cell system 10 is equipped with an electronic control unit (ECU) 30 which handles the operation control of the whole system. In FIG. 1, only control lines representing electric connections related to the partial control handled by the ECU 30, however, the ECU 30 can control other configurations (components) within the system. Herein, the ECU 30, which is electrically connected to the electrochemical cell 15 and to the discharge valve 20, eliminates the undesirable influences on the electrochemical cell 15 etc by controlling a change of the hydrogen concentration within the inlet port electrode 15*a*, in other words, controlling the opening/closing of the discharge valve 20 in accordance with a degree of the impurity condensation in the inlet port electrode 15*a*.

Herein, the undesirable influences produced as the result of the impurity condensing action by the electrochemical cell 15 will be described based on FIG. 2. FIG. 2 shows a time change of an applied voltage, which is obtained from an experiment conducted by the applicant of the present application, when the applied voltage to between the inlet port electrode 15*a* and the outlet port electrode 15*b* is controlled so that a fixed current flows to between the two electrodes in order to perform the hydrogen transmission by the electrochemical cell 15. Then, at the timing marked with [valve open] in FIG. 2, the discharge valve 20 is opened, while the exhaust of the anode off-gas in the inlet port electrode 15*a* is conducted, and the discharge valve 20 is in a closed state at other timings. It can be understood that the applied voltage to between the inlet port electrode 15*a* and the outlet port electrode 15*b* decreases by opening the discharge valve 20.

Herein, when the hydrogen concentration within the inlet port electrode 15*a* decreases due to the hydrogen transmissive action by the electrochemical cell 15, the impurities are condensed in the inlet port electrode 15*a*, and there decreases an effective area substantially utilizable for the hydrogen transmission in a surface area of the inlet port electrode 15*a*. As a result, the current gets concentrated at a portion having a high hydrogen concentration within the cell surface when performing the hydrogen transmission with a fixed current value, and resultantly the applied voltage to between the two electrodes rises. If the applied voltage excessively rises, there is a case of causing deterioration of the electrode and a damage to the electrolyte film 15*c* of the electrochemical cell 15. For example, an area indicated by T1 in FIG. 2 has a state where the hydrogen in the inlet port electrode 15*a* is deficient to some extent, as a result, the applied voltage to between the two electrodes reaches a voltage (approximately 1.2 V) by which to cause electrolysis of the water, whereby there is, it is considered, an extremely increased possibility of bringing about the deterioration of the electrode. When going through the state where the applied voltage to between the two electrodes rises more (see an area indicated by T2 in FIG. 2), the decomposition of the electrolyte film 15*c* of the electrochemical cell 15 is accelerated, with the result that the electrolyte film 15*c* might be damaged. A symbol T3 in FIG. 2 represents a behavior of the applied voltage if damaged.

Thus, in the electrochemical cell 15, for eliminating the undesirable influences of the impurity condensing action which occur simultaneously with the hydrogen transmissive action, it is essential to discharge the anode off-gas within the inlet port electrode 15*a* of the electrochemical cell 15, i.e., the anode off-gas with the condensed impurities at the proper timing. On the other hand, if the anode off-gas is discharged frequently in order to avoid the inconvenience such as this, a quantity of the hydrogen gas contained in the anode off-gas to be discharged increases, and the hydrogen gas serving as the fuel is uselessly discharged, resulting in a decline of the fuel consumption of the fuel cell system 10.

Figure 3A:
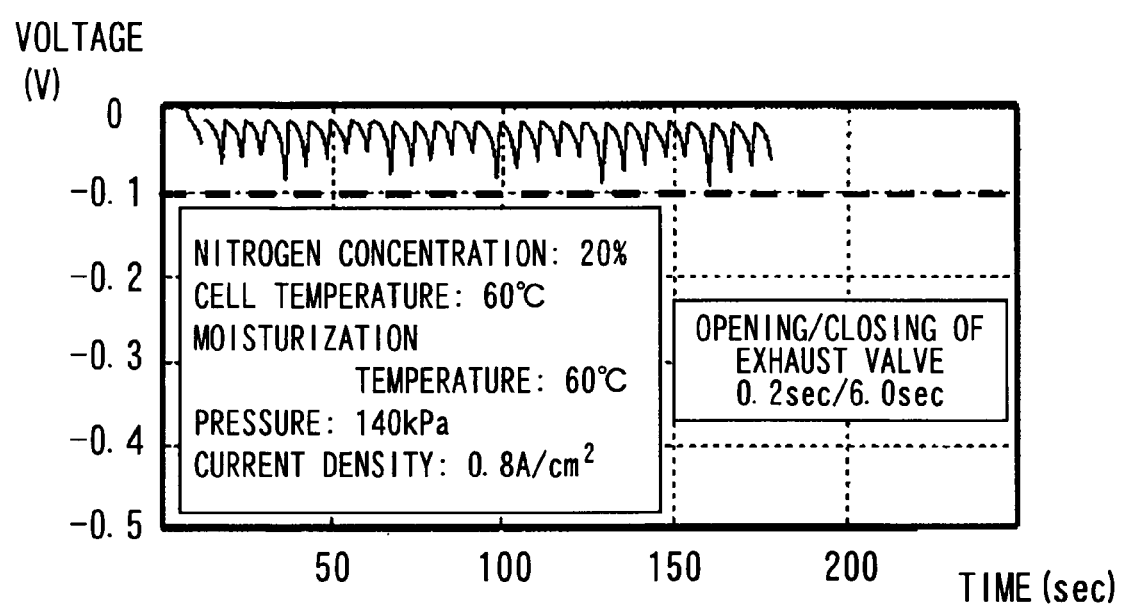
FIG. 3A A diagram showing the transition of the applied voltage of the electrochemical cell when periodically opening a discharge valve for 0.2 sec and closing the discharge valve for 6.0 sec.
Figure 3B:
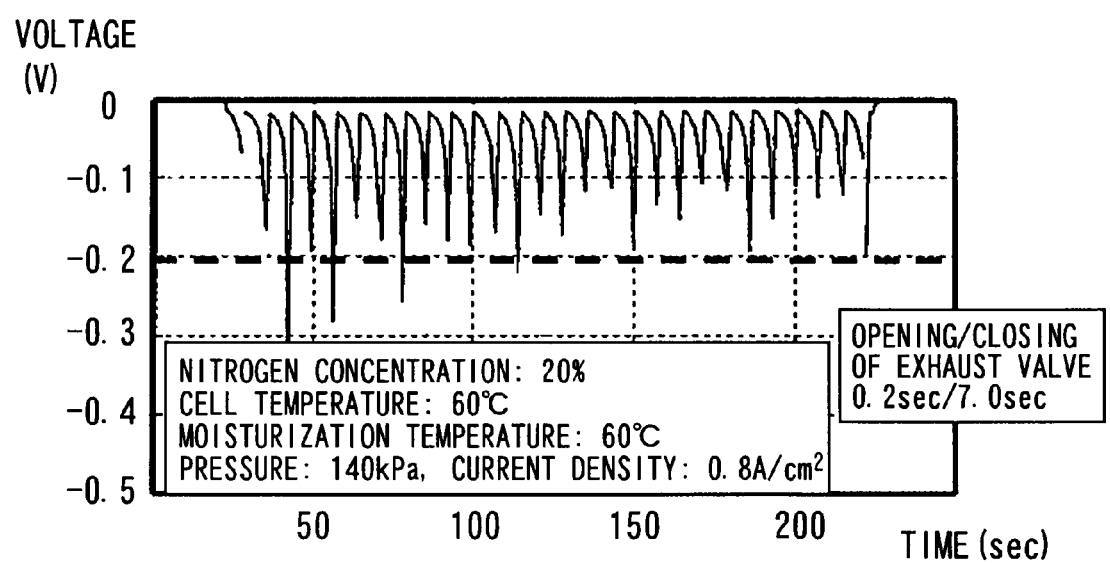
FIG. 3B A diagram showing the transition of the applied voltage of the electrochemical cell when periodically opening a discharge valve for 0.2 sec and closing the discharge valve for 7.0 sec.

Such being the case, the discharge timing of the anode off-gas is required to be controlled in away that takes the fuel consumption of the fuel cell 1 into consideration, and this control will hereinafter be described based on FIGS. 3A through 6. FIGS. 3A and 3B are graphs each showing transition of the applied voltage to between the inlet port electrode 15*a* and the outlet port electrode 15*b* when discharging the anode off-gas within the inlet port electrode 15*a* by changing the opening/closing timing of the discharge valve 20 in the fuel cell system 10. In the case illustrated in FIG. 3A, the discharge valve 20 is so controlled as to open and close periodically at a cycle of opening the value for 0.2 sec and closing the value for 6.0 sec, and, in the case shown in FIG. 3B, the discharge valve 20 is so controlled as to open and close periodically at a cycle of opening the value for 0.2 sec and closing the value for 7.0 sec. Note that the applied voltage is controlled under an operating condition of the electrochemical cell 15 in the cases shown in FIGS. 3A and 3B, in which a nitrogen concentration in the anode off-gas to be fed is 20%, a cell temperature of the electrolyte film 15*c* is 60° C., a moisturization temperature is 60° C., an anode off-gas pressure is 140 kPa, and a density of the current flowing to between the inlet port electrode 15*a* and the outlet port electrode 15*b* is 0.8 A/cm$^2$.

As compared with the case illustrated in FIG. 3A, the valve closing time of the discharge valve 20 at one cycle is long for the valve opening time in the case shown in FIG. 3B. Therefore, the impurity concentration within the inlet port electrode 15*a* at one cycle in the case shown in FIG. 3B is higher than in the case illustrated in FIG. 3A, and this point is reflected in a difference between peak values of the applied voltages shown in the respective drawings. Namely, the effective area of the inlet port electrode 15*a* decreases due to the rise of the impurity concentration, and as a result the applied voltage to between the electrodes in the case illustrated in FIG. 3B is higher than in the case shown in FIG. 3A. At this time, the respective cases in FIGS. 3A and 3B are examined in terms of the power consumption for operating the electrochemical cell 15. The power consumption is an energy consumption quantity per unit time and is controlled so that the current flowing between the electrodes becomes fixed in each case, and hence, though an instantaneous applied voltage can be used as a parameter related to the power consumption, it is considered that a time average of an integrated value of the applied voltages is preferably adopted (which will hereinafter be referred to as an [average applied voltage]) because of having such a merit that it is possible to reduce misjudgment and a variation due to an instantaneous fluctuation of the applied voltage, accuracy of a measuring device, an error caused by a noise in a measuring system, etc, and an expensive high-accuracy measuring device is not needed. Then, FIG. 4 shows a correlation between the average applied voltage in each of the cases shown in FIGS. 3A and 3B and the impurity concentration of the nitrogen etc contained in the anode off-gas discharged outside the system at one cycle of opening and closing the discharge valve 20.

Figure 4:
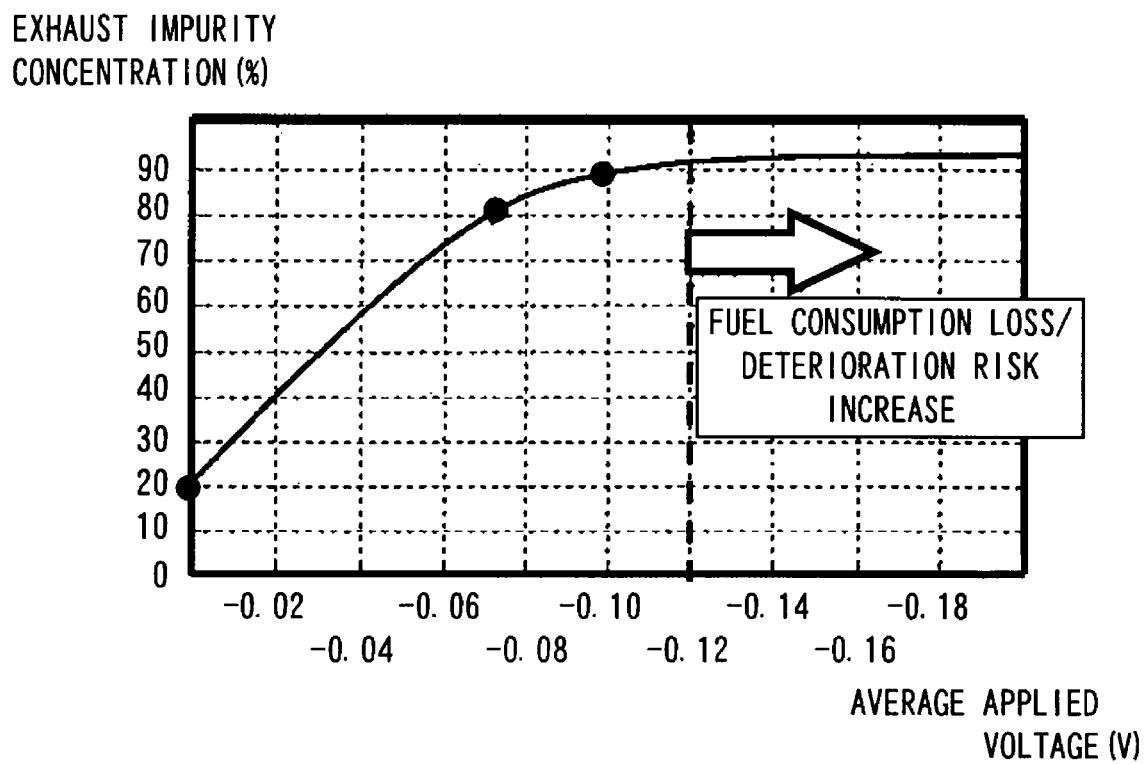
FIG. 4 A diagram illustrating a correlation between the applied voltage of the electrochemical cell and a concentration of impurities contained in the anode off-gas discharged by the discharge valve.

FIG. 4 is a graph showing transition of a discharge impurity concentration, which accompanies the transition of the average applied voltage and is derived from a correlation (points before and after the average applied voltage of −0.07 V)

between the average applied voltage and the impurity concentration in the anode off-gas discharged from the discharge valve 20 in the case shown in FIG. 3A, from a correlation (points before and after the average applied voltage of −0.10 V) between the average applied voltage and the impurity concentration in the case shown in FIG. 3B and from an initial state (which is an initial value of 20% as the impurity concentration when the average applied voltage is zero, in other words, when the electrochemical cell 15 does not operate) of the anode off-gas. The derivation of the graph is based on a premise that the discharge impurity concentration gradually approximates 100% with an increase in absolute value of the average applied voltage.

Herein, as understood from the transition graph illustrated in FIG. 4, a large change is not seen in the concentration of the impurities contained in the discharged anode off-gas even when the absolute value of the average applied voltage is set equal to or larger than 0.12 V. The present applicant could find out the following points from this phenomenon.

(1) The condensation efficiency of the impurities to be discharged decreases even when increasing the average applied voltage, and on the other hand the power consumption of the electrochemical cell 15 rises. As a result, there declines the fuel consumption of the fuel cell system scheming to efficiently utilize the hydrogen through the circulation of the hydrogen.

(2) With the rise of the average applied voltage, there is an increased possibility that the electrodes of the electrochemical cell 15 get deteriorated and the electrolyte film 15c is damaged.

Figure 5:
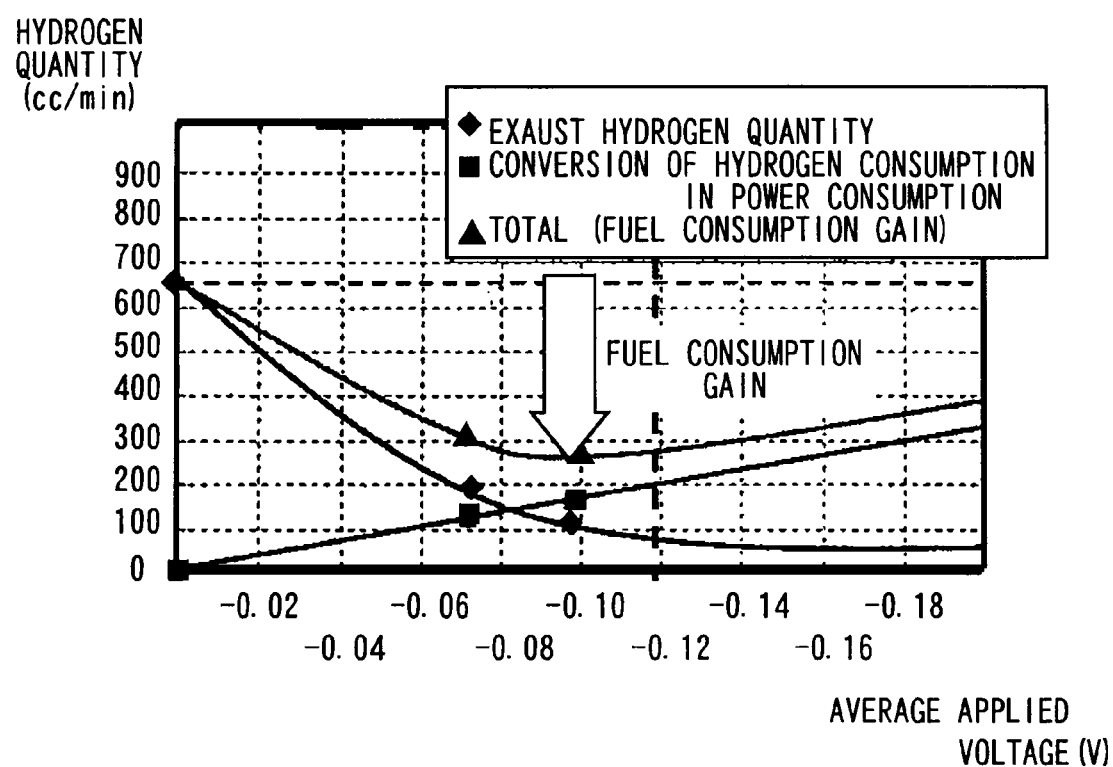
FIG. 5 A diagram illustrating a correlation between the applied voltage of the electrochemical cell and a fuel consumption gain of the fuel cell system.

Then, a fuel consumption gain of the fuel cell system 10 is examined based on the average applied voltage and the concentration transition of the discharged impurities shown in FIG. 4. Herein, the fuel consumption gain is an index indicating what degree the fuel consumption of the fuel cell system 10 is improved to from a certain reference state and is represented by a quantity of hydrogen serving as the fuel, and a change of the fuel consumption gain is shown in FIG. 5. In FIG. 5, the average applied voltage is given along the axis abscissa, while the hydrogen quantity is taken along the axis of ordinates. To start with, the correlation between the average applied voltage and the discharge hydrogen quantity is plotted (a plotting symbol takes a rhombus) based on the graph shown in FIG. 4. The discharge hydrogen quantity given herein is a quantity determined uniquely from the discharge impurity quantity shown in FIG. 4. Next, the power consumption for generating the average applied voltage by the electrochemical cell 15 is converted into the hydrogen consumption quantity, and the correlation between the average applied voltage and the power consumption is plotted (the plotting symbol takes a square). Note that the conversion of this hydrogen consumption quantity is conducted based on the correlation between the hydrogen consumption quantity and the generated power in one unit body of the fuel cell. Then, the correlation between the average applied voltage and the discharge hydrogen quantity and the correlation between the average applied voltage and the power consumption are totaled and thus plotted (the plotting symbol takes a triangle) as a correlation between the average applied voltage and the fuel consumption gain. Note that the fuel consumption gain is to be calculated in a state where the hydrogen transmissive action is not performed by the electrochemical cell, i.e., calculated based on the hydrogen quantity when the average applied voltage is zero.

As can be understood from the transition of the fuel consumption gain shown in FIG. 5, the fuel consumption gain is improved as the average applied voltage rises from 0 V and reaches the best state when in the vicinity of −0.10 V. On the other hand, the fuel consumption gain in turn gets deteriorated as the average applied voltage rises over 0.10 V. This is because the case where the average applied voltage rises over 0.10 V as illustrated in FIG. 5 represents a state in which the discharge hydrogen quantity can not be effectively reduced, and, though, the power consumption of the electrochemical cell 15 increases. Thus, in the electrochemical cell 15, even when increasing the value of the applied voltage to between the electrodes in a way that tries to accelerate the impurity condensation action accompanying the hydrogen transmission action, a power loss in the electrochemical cell 15 is dominant over the efficient utilization of the hydrogen obtained by the impurity condensation action if the average applied voltage exceeds a certain level, with the result that the fuel consumption gain of the electrochemical cell 15 deteriorates. In the fuel cell system 10, however, it is useful in terms of the fuel consumption gain to control the discharge timing of the anode off-gas by use of the discharge valve 20. This being the case, the reference for the discharge timing of the anode off-gas, which is determined in terms of the fuel consumption gain, is set as a first reference, and the average applied voltage serving as the reference set according to the first reference is set as a first reference voltage.

Moreover, in the electrochemical cell 15, when the inter-electrode applied voltage rises and reaches about 1.2 V, the water electrolysis occurs on the side of the inlet port electrode 15a. Furthermore, when the applied voltage rises and reaches about 1.2 V-2 V, oxidation reaction of carbon of a base material contained in a catalyst layer of the inlet port electrode 15a is accelerated. Then, when the applied voltage rises and becomes equal to or lager than approximately 2 V, there is an increased possibility of advancing to the damage to the electrolyte film 15c. As described above, with the rise of the applied voltage, the possibility of causing the deterioration of the electrochemical cell 15 increases, and hence, in terms of adequately preventing this possibility, it is useful to control the discharge timing of the anode off-gas by the discharge valve 20. Then, the reference for the discharge timing of the anode off-gas, which is determined from a viewpoint of the fuel consumption gain, is set as a second reference. Note that the water electrolysis and the oxidation reaction of the carbon related to the deterioration of the electrochemical cell 15 are events that can occur instantaneously, so that the voltage serving as the reference set according to the second reference involves adopting not the average applied voltage but the applied voltage itself which changes momentarily, and this applied voltage is referred to as the second reference voltage.

Figure 6:
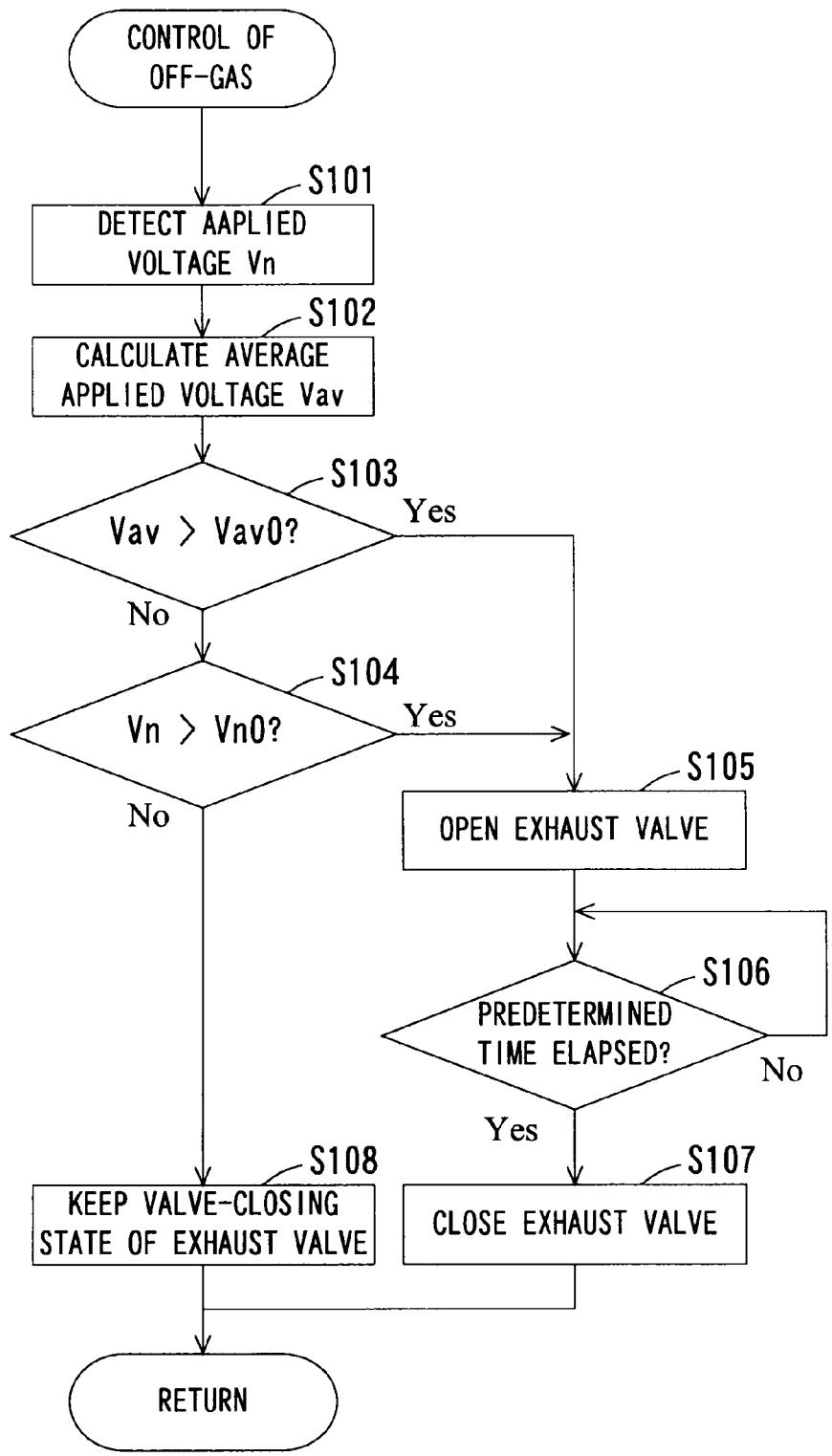
FIG. 6 A first diagram illustrating a control flow for discharging the anode off-gas, which is executed in the fuel cell system shown in FIG. 1.

Then, in the fuel cell system 10, the ECU 30 provided therein executes the control of the discharge timing of the anode off-gas (which will hereinafter be termed the [off-gas discharge control]) by the discharge valve 20 in a way that makes use of the first reference voltage and the second reference voltage. FIG. 6 shows a flowchart of the off-gas discharge control. This off-gas discharge control is executed by the ECU 30 at the predetermined timing, e.g., the timing of a fixed interval, and the discharge valve 20 is in the valve closing state at the start of executing the control.

To begin with, in S101, an applied voltage Vn between the inlet port electrode 15a and the outlet port electrode 15b is detected in the electrochemical cell 15. Note that the applied voltage Vn is detectable by the ECU 30 according to an output given from an unillustrated voltage meter installed on the side of the electrochemical cell 15. Next, in S102, an average applied voltage Vav is calculated from the applied voltage Vn detected in S101 and the applied voltage(s) detected before. It is to be noted that if the number of samples of the applied voltage detected for calculating the average applied voltage Vav is too small, there might be a case in which the fuel consumption gain described above is hard to be guaranteed substantially by the average applied voltage, i.e., the average applied voltage is easy to be affected by an abrupt large fluctuation of the applied voltage. Accordingly, the average applied voltage Vav may be calculated when gathering a predetermined or larger number of samples. Upon an end of the process in S102, the operation proceeds to S103.

Next, in S103, it is determined whether the average applied voltage Vav calculated in S102 exceeds the first reference voltage Vav0 or not. The first reference voltage Vav0 is the reference voltage value determined in terms of the fuel consumption gain of the fuel cell system 10 as described above, and, if the fuel cell system 10 has a characteristic of the fuel consumption gain shown in FIG. 5, 0.10 V is, it is preferable, set as the first reference voltage Vav0. If determined to be affirmative in S103, the operation proceeds to S105, and, whereas if determined to be negative in S103, the operation advances to S104.

Subsequently, in S104, it is determined whether or not the applied voltage Vn detected in S101 exceeds the second reference voltage Vn0. The second reference voltage Vn0 is the reference voltage value determined from the viewpoint of preventing the deterioration of the electrochemical cell as stated above. It is preferable for effectively preventing the deterioration of the electrochemical cell 15 that the applied voltage (about 1.2 V) when in the water electrolysis produced at the initial stage of the deteriorating process of the electrochemical cell 15 described above is set to the second reference voltage Vn0. If determined to be affirmative in S104, the operation proceeds to S105, and, whereas if determined to be negative in S104, the operation advances to S108.

Next, if determined to be affirmative in S103 or S104, and the operation proceeds to S105, in which case the discharge valve 20 is set in the valve opening state. With this contrivance, it follows that at least the anode off-gas within the inlet port electrode 15a of the electrochemical cell 15 is discharged outside the system. Then, thereafter the operation proceeds to S106, in which it is determined whether or not a predetermined period of time elapses since the discharge valve 20 has been opened. This predetermined period of time is a period of time for which the discharge valve 20 continues to open. Herein, if determined to be affirmative, the operation advances to S107, and, whereas if determined to be negative, the determination in S106 is again made. Next, in S107, the discharge valve 20 is returned to the valve closing state. When finishing the process in S107, the off-gas discharge control is again executed from S101.

Further, if determined to be negative in S104, and the operation proceeds to S108, in which case the closing state of the discharge valve is kept. Namely, the anode off-gas in the inlet port electrode 15a of the electrochemical cell 15 is not discharged outside the system. Upon finishing the process in S108, the off-gas discharge control is again executed from S101.

According to the off-gas discharge control described above, the discharge timing of the anode off-gas by the discharge valve 20 is controlled based on the two references, i.e., the first reference voltage and the second reference voltage. As a result, the discharge of the anode off-gas is executed, which takes account of the viewpoint of keeping in the preferable state the fuel consumption gain of the fuel cell system 10 having the circulation route 12 and the viewpoint of preventing the deterioration of the electrochemical cell 15, thereby enabling the efficient and safety hydrogen utilization to be conducted in the fuel cell system 10 having the circulation route 12. Incidentally, under the off-gas discharge control described above, the discharge timing of the anode off-gas is controlled by using the two reference voltages such as the first reference voltage and the second reference voltage, however, the discharge timing of the anode off-gas may be controlled by using at least any one of the reference voltages in the fuel cell system 10.

Second Working Example

An item preferable to be taken into consideration under the discharge control of the anode off-gas by the discharge valve 20 in the fuel cell system 10 including the electrochemical cell 15, is exemplified by a time-based change rate of the applied voltage (which will hereinafter be simply termed the [voltage change rate]) between the electrodes of the electrochemical cell 15. This is because the applied voltage change rate tends to be largely different depending on the concentration of the impurity in the anode off-gas within the inlet port electrode 15a, and hence, when trying to perform the discharge control of the anode off-gas by the discharge valve 20 if the applied voltage value exceeds the predetermined reference voltage, it is difficult to discharge the anode off-gas at the proper timing due to a point that the physical operation of the discharge valve 20 does not follow up with the abrupt fluctuation of the applied voltage. Such being the case, the second working example will show an embodiment for performing the discharge control of the anode off-gas more properly in the first working example discussed above.

Figure 7:
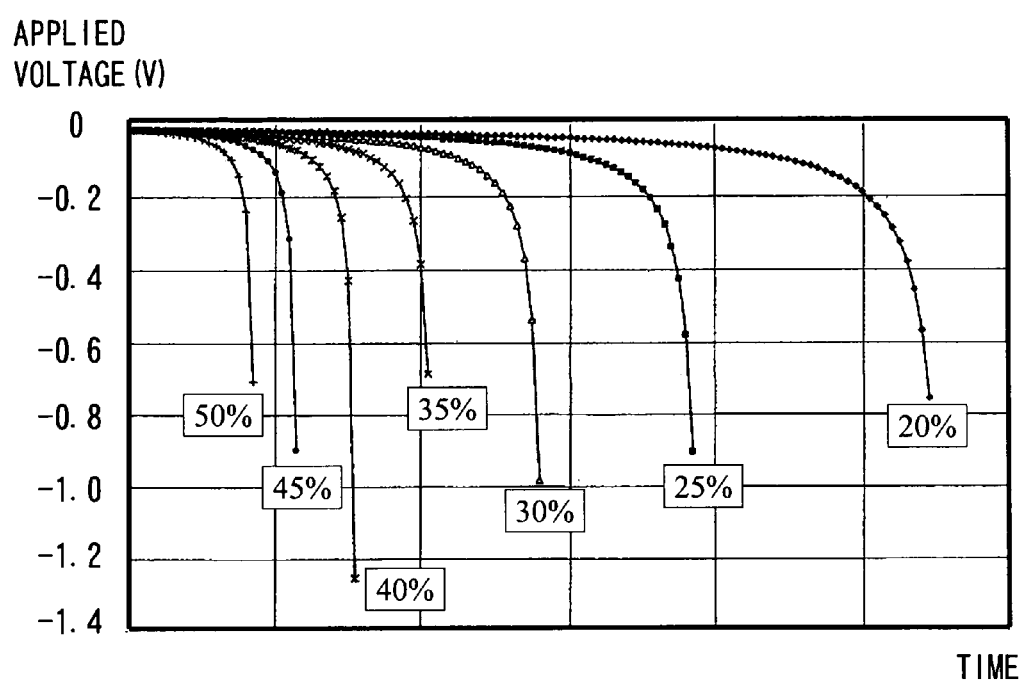
FIG. 7 A diagram illustrating a correlation between the concentration of the impurities contained in the anode off-gas within an inlet port electrode of the electrochemical cell and a change of the applied voltage.

Herein, FIG. 7 shows time transition of the applied voltage which corresponds to a different impurity concentration in the anode off-gas within the inlet port electrode 15a when controlling the applied voltage so that the fixed current flows to between the electrodes in the electrochemical cell 15. A common tendency of the time transition of the applied voltage is that the change of the applied voltage is extremely small initially when the voltage is applied but becomes sharp at a point of time when a certain period of time elapses. Then, as the impurity concentration in the anode off-gas in the inlet port electrode 15a increases, there is shortened the time till the change of the applied voltage since the start of applying the voltage becomes sharp. This is because, as described above, the effective area of the inlet port electrode 15a decreases due to the existence of the impurities.

Figure 8:
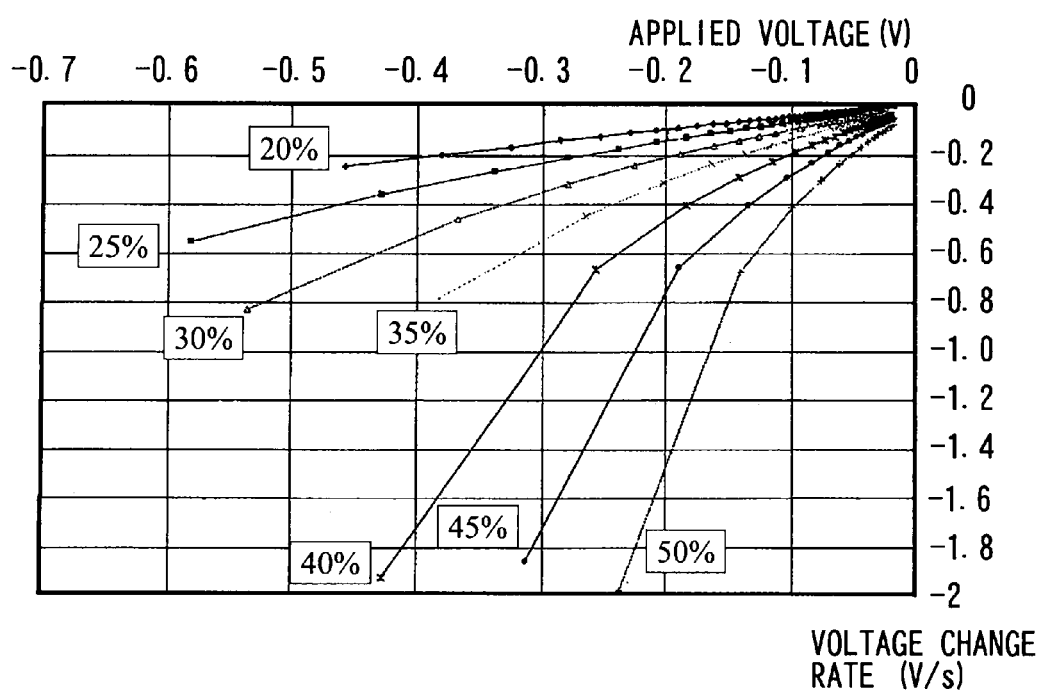
FIG. 8 A diagram illustrating the correlation between the concentration of the impurities contained in the anode off-gas within an inlet port electrode of the electrochemical cell and a change rate of the applied voltage.

Further, FIG. 8 shows a graph representing a correlation between the applied voltage and the voltage change rate, which is derived based on the characteristic of the applied voltage shown in FIG. 7. According to this graph, when the impurity concentration in the anode off-gas is comparatively as low as 20% and 25%, the voltage change rate is restrained comparatively low even if the applied voltage is high to some extent, however, on the other hand, when the impurity concentration in the anode off-gas is comparatively high, the voltage change rate takes an extremely high value even by restraining the applied voltage equal to or lower than 20% and 25%. It is understood from this point that in the case of performing the discharge control by the discharge valve 20 in a way that sets the reference to the voltage applied to between the electrodes, the valve opening timing of the discharge valve 20 is harder to be precisely controlled as the impurity concentration in the anode off-gas becomes higher.

Figure 9:
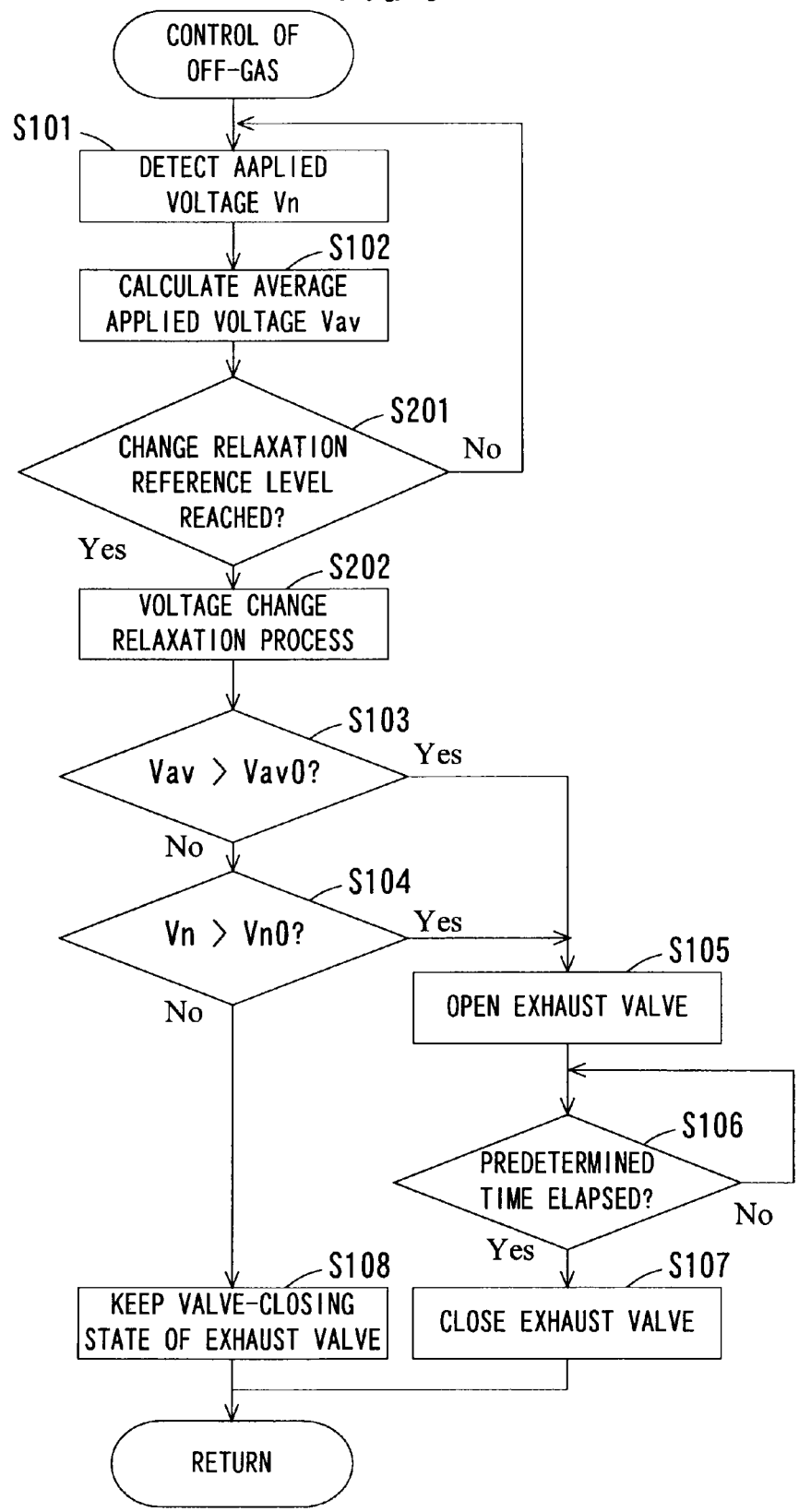
FIG. 9 A second diagram illustrating the control flow for discharging the anode off-gas, which is executed in the fuel cell system shown in FIG. 1.

This being the case, under the off-gas discharge control according to the second working example, in order to conduct the valve opening operation of the discharge valve 20 exactly at the desired timing, and hence, a process of relaxing the change rate of each applied voltage is executed before the average applied voltage or the applied voltage between the electrodes of the electrochemical cell 15 reaches the first reference voltage or the second reference voltage. The reference for executing this applied voltage change relaxing process is referred to as a change relaxation reference, and FIG. 9 shows a flowchart of the off-gas discharge control under which the change relaxing process is executed. Note that the same processes as those of the off-gas discharge control shown in FIG. 6 in the off-gas discharge control illustrated in FIG. 9 are marked with the same reference numerals, and the in-depth description thereof is omitted.

Under the off-gas discharge control according to the second working example, when finishing the process in S102, the operation proceeds to S201. Then, in S201, it is determined whether or not the predetermined parameter reaches the change relaxation reference. Herein, if determined to be affirmative, the operation proceeds to S202, then the change relaxing process of the applied voltage is executed in S202, and thereafter the processes from S103 onward are executed. Further, if determined to be negative in S201, the processes from S101 are repeated again. Herein, the second working example exemplifies a plurality of specific examples as below with respect to the determination (S201) as to reaching the change relaxation reference and the change relaxing process (S202) of the applied voltage. Note that the applied voltages as the reach determination target voltage and the change relaxing process target voltage may be both of the average applied voltage corresponding to the first reference voltage shown in the first working example and the applied voltage corresponding to the second reference voltage, however, in the following discussion, the reach determination target voltage and the change relaxing process target voltage are simply termed the [applied voltages] for simplifying the description by avoiding the redundant explanations.

First Specific Example

A first specific example is that as shown in an upper portion of FIG. 10A, when exceeding a third reference voltage corresponding to the change relaxation reference through which the applied voltage goes invariably before reaching the first reference voltage or the second reference voltage and set lower than the first reference voltage or the second reference voltage, in other words, when the applied voltage becomes lower than the third reference voltage, the affirmative determination is made in the reach determination. Then, thereafter the change relaxing process is executed, and one example of the change relaxing process is that as shown in a lower portion of FIG. 10A, the change rate of the applied voltage is relaxed by decreasing the current flowing between the electrodes down to a level lower than before executing the change relaxing process.

Figure 10B:
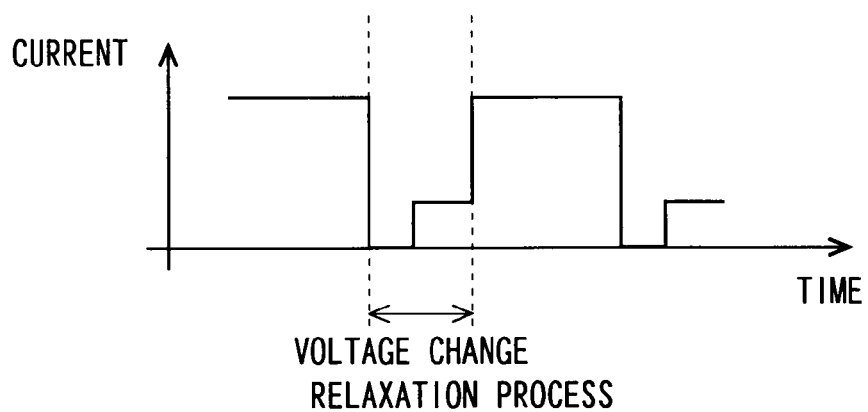
FIG. 10B A second diagram illustrating the specific process for relaxing the change rate of the applied voltage of the electrochemical cell, which is executed in the control flow shown in FIG. 9.
Figure 10C:
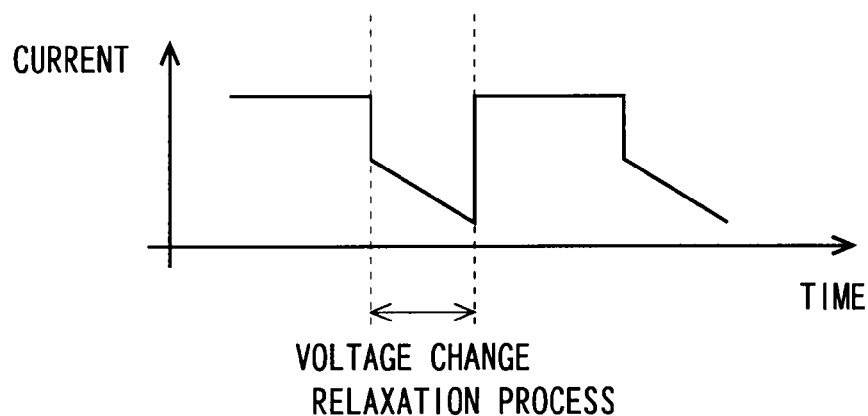
FIG. 10C A third diagram illustrating the specific process for relaxing the change rate of the applied voltage of the electrochemical cell, which is executed in the control flow shown in FIG. 9.

Moreover, another example of the change relaxing process is that as illustrated in FIG. 10B, after the current flowing between the electrodes has been set to zero immediately when making the affirmative determination in the reach determination, the current may be adjusted to a comparatively low current value as shown in the lower portion of FIG. 10A. Furthermore, an available way of flowing the current is that the current intermittently flows so as to become zero again after temporarily flowing the current. Another example of the change relaxing process is that as shown in FIG. 10C, immediately when determined to be affirmative in the reach determination, the inter-electrode current is decreased and further gradually decreased with the elapse of the time. Thus, before the applied voltage reaches the reference voltage by which the discharge valve 20 opens, the change rate thereof is relaxed, whereby the discharge valve 20 can be prevented from opening in the state where the abrupt voltage change rate occurs to thereby enable the valve opening operation of the discharge valve 20 to be performed at the desired timing.

Second Specific Example

In a second specific example, as shown in FIG. 11, the applied voltage change rate is set as a parameter of the reach determination. The transition of the applied voltage is shown in the upper portion of FIG. 11, the transition of the change rate of the applied voltage is shown in the middle portion, and the transition of the inter-electrode current of the electrochemical cell 15 is shown in the lower portion. As shown in the middle portion of FIG. 11, when the change rate of the applied voltage reaches the predetermined reference change rate corresponding to the change relaxation reference, the affirmative determination is made in the reach determination. Then, though the change relaxing process is hereafter conducted, by way of one example of the change relaxing process, as shown in the lower portion of FIG. 11, the change rate of the applied voltage is relaxed by setting the current flowing between the electrodes at the lower level than before executing the change relaxing process. Further, the current adjustment shown in FIGS. 10B and 10C may also be carried out.

Third Specific Example

Figure 12:
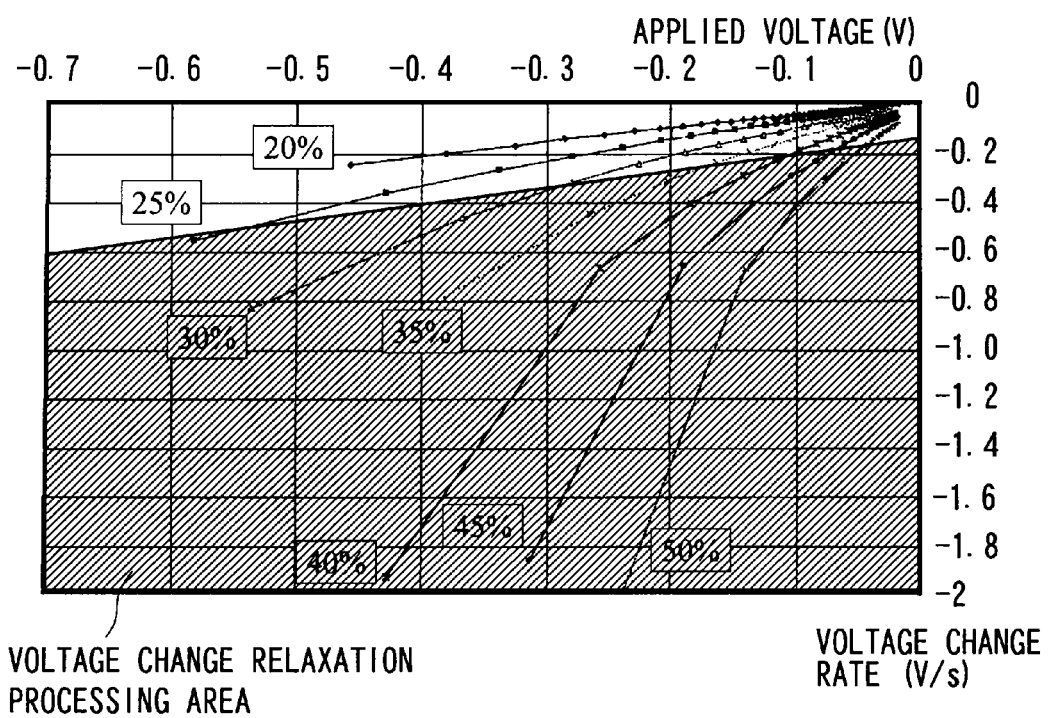
FIG. 12 A diagram illustrating a control map used for the specific process for relaxing the change rate of the applied voltage of the electrochemical cell, which is executed in the control flow shown in FIG. 9.

In a third specific example, the ECU 30 has a control map for making the reach determination, in which if the actual applied voltage and voltage change rate thereof belong to an area where the change relaxing process specified in the control map is executed, the affirmative determination is to be made in the reach determination. Herein, FIG. 12 illustrates the control map established by the applied voltage and the change rate thereof, and the control map is derived based on the graph shown in FIG. 8. Herein, the area (depicted by oblique lines in the map) in which to execute the change relaxing process is determined in away that takes account of valve opening responsibility of the discharge valve 20, a change speed of the applied voltage corresponding to the impurity concentration in the anode off-gas, etc so that a delay of the valve opening operation of the discharge valve 20 due to disability of following up with the abrupt change of the applied voltage can be avoided. For example, if the impurity concentration in the anode off-gas is on the order of 25%, it is considered that a problem of the responsibility of the discharge valve 20 does not arise, and further, it is considered that the discharge valve 20 is not requested to perform the strict valve opening operation in the area where the applied voltage is extremely low (which is, e.g., equal to or smaller than −0.1 V), therefore the area indicated by the oblique lines in FIG. 12 is set to the area in which to execute the change relaxing process in a way that takes these points into consideration.

Note that if the applied voltage and the change rate detected by the ECU 30 belong to the area where the change relaxing process is executed, the affirmative determination is made in the reach determination. Then, though the change relaxing process is carried out hereafter, by way of one example of the change relaxing process, as shown in the lower portion of FIG. 10A, the change rate of the applied voltage is relaxed by setting the current flowing between the electrodes at the lower level than before executing the change relaxing process. Further, the current adjustment shown in FIGS. 10B and 10C may also be conducted.

Fourth Specific Example

In a fourth specific example, the parameter for the reach determination involves using an integrated current value defined as an integrated value of the current flowing to between the inlet port electrode 15a and the outlet port electrode 15b from an immediate completion point of time when the discharge valve 20 immediately discharges the anode off-gas and completes the discharge. The integrated current value reflects an integrated transmission quantity of the transmitted hydrogen in the electrochemical cell 15 and is therefore considered to be the parameter which reflects even the impurity concentration in the anode off-gas exerting large influence on the change rate of the applied voltage. In the case where the integrated current value is set as the parameter for the reach determination, when the integrated current value reaches a predetermined integrated current value corresponding to the change relaxation reference, the affirmative determination is made in the reach determination. Then, though the change relaxing process is carried out hereafter, by way of one example of the change relaxing process, as shown in the lower portion of FIG. 10A, the change rate of the applied voltage is relaxed by setting the current flowing between the electrodes at the lower level than before executing the change relaxing process. Further, the current adjustment shown in FIGS. 10B and 10C may also be conducted.

What is claimed is:

1. A fuel cell system having a circulation route so that a fuel gas containing hydrogen is supplied on the side of an anode electrode for electrochemical reaction in a fuel cell, and a part or whole of an anode off-gas given from said fuel cell can be circulated on the side of said anode electrode of said fuel cell again for the electrochemical reaction, said system comprising:
    an electrochemical cell having an inlet port electrode and an outlet port electrode with an electrolyte film being interposed therebetween, connected to said circulation route so that a part or whole of the anode off-gas discharged from said fuel cell is supplied to said inlet port electrode, getting the hydrogen contained in the anode off-gas to selectively transmit said outlet port electrode by a current flowing between said inlet electrode and said outlet port electrode, and connected to enable the transmitted hydrogen to be supplied on the side of said anode electrode;
    a current control unit which is programmed to control a current flowing between said inlet port electrode and said outlet port electrode in said electrochemical cell;
    a discharge unit which is provided on the side of said inlet port electrode of said electrochemical cell and discharges the anode off-gas within at least said inlet port electrode toward the outside of said system; and
    a discharge control unit which is programmed to control a discharge timing of the anode off-gas by said discharge unit according to a predetermined discharge reference determined by a correlation between electric power consumed for the hydrogen transmission in said electrochemical cell and a residual hydrogen concentration in the anode off-gas discharged by the discharge unit.

2. A fuel cell system according to claim 1, wherein said discharge control unit is programmed to execute the discharge of the anode off-gas by said discharge unit when a time-based average of an integrated value of an applied voltage applied between said inlet port electrode and said outlet port electrode of said electrochemical cell exceeds a first reference voltage value corresponding to the predetermined discharge reference in a time elapse from an immediate predetermined completion timing, when said discharge unit completes the discharge of the anode off-gas.

3. A fuel cell system according to claim 2, wherein said discharge control unit is further programmed to execute the discharge of the anode off-gas by said discharge unit when a value of the applied voltage applied between said inlet port electrode and said outlet port electrode of said electrochemical cell exceeds a second reference voltage value determined based on a load on said electrochemical cell due to a hydrogen deficient state in said inlet port electrode of said electrochemical cell.

4. A fuel cell system according to claim 3, wherein the second reference voltage value is a voltage value with which water electrolysis occurs due to the hydrogen deficient state in said inlet port electrode of said electrochemical cell.

5. A fuel cell system according to claim 2, wherein said current control unit is programmed to control the current between said inlet port electrode and said outlet port electrode by adjusting the applied voltage between said two electrodes, and relax a time-based change rate of the applied voltage between said inlet port electrode and said outlet port electrode of said electrochemical cell before said discharge control unit executes the discharge of the anode off-gas on the basis of the applied voltage applied between said two electrodes.

6. A fuel cell system according to claim 5, wherein said current control unit is programmed to execute the relaxation of the time-based change rate of the applied voltage between said inlet port electrode and said outlet port electrode by conducting at least one of reducing the current value between said two electrodes down to a level lower than before relaxing the time-based change rate of the applied voltage between said two electrodes, and temporarily setting the current value between said two electrodes to zero.

7. A fuel cell system according to claim 5, wherein said current control unit is programmed to execute the relaxation of the time-based change rate of the applied voltage between said inlet port electrode and said outlet port electrode of said electrochemical cell when a predetermined voltage related to the applied voltage applied between said two electrodes exceeds a third reference voltage set lower than the reference voltage value on such an occasion that said discharge unit executes the discharge of the anode off-gas.

8. A fuel cell system according to claim 5, wherein said current control unit is programmed to execute the relaxation of the time-based change rate of the applied voltage between said inlet port electrode and said outlet port electrode of said electrochemical cell when a predetermined voltage change rate related to the time-based change rate of the applied voltage applied between said two electrodes exceeds a reference change rate determined based on a residual hydrogen concentration in the anode off-gas discharged by said discharge unit.

9. A fuel cell system according to claim 5, wherein said current control unit is programmed to execute the relaxation of the time-based change rate of the applied voltage between said inlet port electrode and said outlet port electrode of said electrochemical cell when an integrated current value between said two electrodes exceeds a reference integrated current value determined according to the residual hydrogen concentration in the anode off-gas discharged by said discharge unit in a time elapse from an immediate predetermined completion timing when said discharge unit immediately completes the discharge of the anode off-gas.

10. A fuel cell system according to claim 5, wherein said current control unit is programmed to execute the relaxation of the time-based change rate of the applied voltage between said inlet port electrode and said outlet port electrode of said electrochemical cell when the time-based change rate of the applied voltage between said two electrodes belongs a predetermined area in a control map related to the time-based change rate of the applied voltage between said two electrodes, which is determined based on the residual hydrogen concentration in the anode off-gas discharged by said discharge unit.

11. A fuel cell system according to claim 3, wherein said current control unit is programmed to control the current between said inlet port electrode and said outlet port electrode by adjusting the applied voltage between said two electrodes, and relaxes a time-based change rate of the applied voltage between said inlet port electrode and said outlet port electrode of said electrochemical cell before said discharge control unit executes the discharge of the anode off-gas on the basis of the applied voltage applied between said two electrodes.

12. A fuel cell system according to claim 11, wherein said current control unit is programmed to execute the relaxation of the time-based change rate of the applied voltage between said inlet port electrode and said outlet port electrode by conducting at least one of reducing the current value between said two electrodes down to a level lower than before relaxing the time-based change rate of the applied voltage between said two electrodes, and temporarily setting the current value between said two electrodes to zero.

13. A fuel cell system according to claim 11, wherein said current control unit is programmed to execute the relaxation of the time-based change rate of the applied voltage between said inlet port electrode and said outlet port electrode of said electrochemical cell when a predetermined voltage related to the applied voltage applied between said two electrodes exceeds a third reference voltage set lower than the reference voltage value on such an occasion that said discharge unit executes the discharge of the anode off-gas.

14. A fuel cell system according to claim 11, wherein said current control unit is programmed to execute the relaxation of the time-based change rate of the applied voltage between said inlet port electrode and said outlet port electrode of said electrochemical cell when a predetermined voltage change rate related to the time-based change rate of the applied voltage applied between said two electrodes exceeds a reference change rate determined based on a residual hydrogen concentration in the anode off-gas discharged by said discharge unit.

15. A fuel cell system according to claim 11, wherein said current control unit is programmed to execute the relaxation of the time-based change rate of the applied voltage between said inlet port electrode and said outlet port electrode of said electrochemical cell when an integrated current value between said two electrodes exceeds a reference integrated current value determined according to the residual hydrogen concentration in the anode off-gas discharged by said discharge unit in a time elapse from an immediate predetermined completion timing when said discharge unit immediately completes the discharge of the anode off-gas.

16. A fuel cell system according to claim 11, wherein said current control unit is programmed to execute the relaxation of the time-based change rate of the applied voltage between said inlet port electrode and said outlet port electrode of said electrochemical cell when the time-based change rate of the applied voltage between said two electrodes belongs a predetermined area in a control map related to the time-based change rate of the applied voltage between said two electrodes, which is determined based on the residual hydrogen concentration in the anode off-gas discharged by said discharge unit.

* * * * *